(12) United States Patent
Chasse et al.

(10) Patent No.: US 12,226,858 B1
(45) Date of Patent: *Feb. 18, 2025

(54) FABRICATION LAYOUT DEVICE AND METHOD

(71) Applicants: Stephen Lawrence Chasse, Hudson, NH (US); John Michael Evans, Seabrook, NH (US)

(72) Inventors: Stephen Lawrence Chasse, Hudson, NH (US); John Michael Evans, Seabrook, NH (US)

(*) Notice: Subject to any disclaimer, the term of this patent is extended or adjusted under 35 U.S.C. 154(b) by 156 days.

This patent is subject to a terminal disclaimer.

(21) Appl. No.: 17/818,995

(22) Filed: Aug. 11, 2022

Related U.S. Application Data

(63) Continuation of application No. 17/084,132, filed on Oct. 29, 2020, now Pat. No. 11,426,826, which is a
(Continued)

(51) Int. Cl.
*B05B 13/04* (2006.01)
*B05C 1/02* (2006.01)
(Continued)

(52) U.S. Cl.
CPC .............. *B23K 37/04* (2013.01); *B05B 13/04* (2013.01); *B05C 1/027* (2013.01); *B05C 5/02* (2013.01); *B05C 5/0216* (2013.01); *B21D 47/01* (2013.01); *B23K 9/0026* (2013.01); *B23K 9/22* (2013.01); *B23K 9/32* (2013.01); *B23K 31/02* (2013.01);
(Continued)

(58) Field of Classification Search
None
See application file for complete search history.

(56) References Cited

U.S. PATENT DOCUMENTS 3,888,169 A 6/1975 McNaughton
4,014,520 A 3/1977 Walters
(Continued)

FOREIGN PATENT DOCUMENTS

EP 2 927 389 A1 10/2015
WO 2007/113250 A1 10/2007

OTHER PUBLICATIONS

Messer Cutting Systems, Inc., "The Edgemax Precision Cutting System" (2015).
(Continued)

*Primary Examiner* — Binu Thomas
(74) *Attorney, Agent, or Firm* — Finch & Maloney PLLC

(57) ABSTRACT

Techniques and devices are disclosed for a fabrication layout device and assembly table. The device includes a table with a work surface. The work surface being a continuous surface and configured to support a plurality of railing pieces for fabrication of a railing assembly. The device further includes a beam located above the work surface. The beam is operatively coupled to the table, such that the beam moves relative to the work surface in a first direction. Attached to the beam is an ink dispenser. The ink dispenser is configured to move along the beam in a second direction different from the first direction. The ink dispenser is further configured to dispense ink onto the work surface of the table in the form of a pattern of the railing assembly. Railing pieces can be positioned on the pattern so that they can be assembled to one another.

20 Claims, 9 Drawing Sheets

Related U.S. Application Data continuation of application No. 16/775,848, filed on Jan. 29, 2020, which is a continuation of application No. 15/695,294, filed on Sep. 5, 2017, now Pat. No. 10,576,588.

(51) Int. Cl.

| | | |
|---|---|---|
| *B05C 5/02* | (2006.01) | |
| *B21D 47/01* | (2006.01) | |
| *B23K 9/00* | (2006.01) | |
| *B23K 9/22* | (2006.01) | |
| *B23K 9/32* | (2006.01) | |
| *B23K 31/02* | (2006.01) | |
| *B23K 37/04* | (2006.01) | |
| *B23P 25/00* | (2006.01) | |
| *B41J 3/28* | (2006.01) | |
| *B41J 3/407* | (2006.01) | |
| *B41J 3/413* | (2006.01) | |
| *B23P 19/00* | (2006.01) | |
| *B25B 11/02* | (2006.01) | |
| *E04F 11/18* | (2006.01) | |
| *G06T 11/00* | (2006.01) | |

(52) U.S. Cl.
CPC ........ *B23K 31/022* (2013.01); *B23K 37/0408* (2013.01); *B23K 37/0443* (2013.01); *B23K 37/0461* (2013.01); *B23P 25/00* (2013.01); *B41J 3/28* (2013.01); *B41J 3/407* (2013.01); *B41J 3/413* (2013.01); *B23P 19/002* (2013.01); *B25B 11/02* (2013.01); *E04F 11/18* (2013.01); *E04F 11/1808* (2013.01); *E04F 11/1836* (2013.01); *G06T 11/00* (2013.01); *G06T 2200/24* (2013.01)

(56) References Cited

U.S. PATENT DOCUMENTS

| | | | |
|---|---|---|---|
| 4,359,897 A * | 11/1982 | Ugo | B05C 1/027 |
| | | | 118/712 |
| 4,364,330 A * | 12/1982 | Pearl | B26F 1/3813 |
| | | | 118/697 |
| 4,514,899 A * | 5/1985 | Burger | B27F 7/155 |
| | | | 29/721 |
| 4,900,379 A | 2/1990 | Chapman | |
| 5,046,015 A | 9/1991 | Dasher et al. | |
| 5,144,330 A | 9/1992 | Bennett | |
| 5,388,318 A * | 2/1995 | Petta | B25H 7/00 |
| | | | 29/897.31 |
| 5,873,567 A | 2/1999 | Williams | |
| 6,145,212 A | 11/2000 | Geise et al. | |
| 6,170,163 B1 | 1/2001 | Bordignon et al. | |
| 6,222,155 B1 | 4/2001 | Blackmon et al. | |
| 6,317,980 B2 | 11/2001 | Buck, III | |
| 6,731,991 B1 | 5/2004 | Michalski et al. | |
| 6,732,836 B2 | 5/2004 | Ono | |
| 7,621,053 B2 | 11/2009 | Bianchin | |
| 7,878,625 B2 | 2/2011 | van Kalmthout et al. | |
| 9,642,436 B2 | 5/2017 | Miyamoto | |
| 9,707,584 B2 | 7/2017 | Giusti et al. | |
| 9,737,967 B2 | 8/2017 | Reckevicius et al. | |
| 9,840,090 B2 | 12/2017 | Dupre et al. | |
| 10,150,131 B2 | 12/2018 | Giusti et al. | |
| 10,384,443 B2 | 8/2019 | Voina et al. | |
| 10,576,588 B2 | 3/2020 | Chasse et al. | |
| 11,426,826 B2 | 8/2022 | Chasse et al. | |
| 11,462,826 B2 | 8/2022 | Chasse et al. | |
| 2005/0056215 A1 | 3/2005 | Shimoda | |
| 2005/0151818 A1 | 7/2005 | Ozawa | |
| 2009/0211469 A1* | 8/2009 | Kalmthout | B41J 3/28 |
| | | | 101/93.47 |
| 2010/0064956 A1 | 3/2010 | Long et al. | |
| 2011/0011222 A1* | 1/2011 | Bales | B23Q 1/015 |
| | | | 83/72 |
| 2012/0013661 A1 | 1/2012 | Smelser | |
| 2012/0042794 A1 | 2/2012 | Tran | |
| 2014/0020485 A1 | 1/2014 | Tran et al. | |
| 2015/0251267 A1 | 9/2015 | Winn et al. | |
| 2016/0176003 A1 | 6/2016 | Reckevicius et al. | |
| 2018/0147658 A1 | 5/2018 | Shapiro | |
| 2018/0150058 A1 | 5/2018 | Shapiro | |
| 2018/0326525 A1 | 11/2018 | Ann et al. | |
| 2022/0350302 A1 | 11/2022 | Donner | |

OTHER PUBLICATIONS

Rolled Alloys, Inc., "Plate and Sheet Flatness," available at https://www.rolledalloys.com/technical-resources/blog/plate-and-sheet-flatness (Retrieved on Aug. 10, 2017).

Industries, Inc. Saw Cutting, "Size (Axbxc) C8x11.5, HR A36 Channels Standard Structural Sizes," available at http://steelandsaw-cutting.fayindustries.com/item/structural-steel/hr-a36-channels-standard-sstructural-sizes/c8-x-11-5 (Retrieved on Aug. 10, 2017).

Steel Tube Institute, "HSS Hollow Structural Sections, Dimension and Section Properties ASTM A1085" (2013).

Wittenstein Product Catalog 2016-2017, "Low blacklash planetary, gearhead, Servo right-angle gearheads, System solutions, Accessories" (2016).

Beckhoff, "Drive Technology, Documentation, Synchronous Servomotor AM8000 and AM8500" (v.2.2, Jun. 25, 2014).

Beckhoff, "Economy Panel PC-The Industrial PC with mounting arm and 3 1/2-inch motherboard," https://www.beckhoff.com/english.asp?industrial_pc/cp72xx.htm (accessed Jul. 19, 2017).

Beckhoff, "Installation and Operating Instructions for Economy Panel PC CP72xx" (v.2.0, Nov. 9, 2016).

Toolbotics, Tooli G2, via Internet Archive Wayback Machine, available at https://web.archive.org/web/20170827183730/http://www.toolbotics.com (Aug. 27, 2017).

Dispenseworks, "Robotic Dispenser Applications 2," via Internet Archive Wayback Machine available at https://web.archive.org/web/20170118061701 /http://dispenseworks.com/AppBulletins2012/dw_APPLICATION_line_card_all.pdf (Jan. 18, 2017).

Mike Lyon, "Joel Large Scale Pen and Ink Drawing in White and Black Ink on Tinted Paper," via Internet Archive Wayback Machine, available at https://web.archive.org/web/20160508124331 /http://mlyon.com/2011 /joel-large-scale-pen-and-ink-drawing-in-white-and-black-ink-on-tinted-paper (May 8, 2016).

Lincoln Electric, "Operator's Manual Torchmate Classic 4x8," via Internet Archive Wayback Machine, available at https://web.archive.org/web/20170807101159/http://torchmate.com/uploads/downloads/Torchmate-4x8-Classic-Assembly-Guide.pdf (Jul. 8, 2015).

Rockcliff Machine Inc., via Internet Archive Wayback Machine, available at https://web.archive.org/web/20170711015425/https://www.rockcliffmachine.com/ (Jul. 11, 2017).

Ota Neuzil, "CNC Airbrush Machine," available at https://www.youtube.com/watch?v=PIWX-pQsZs (Jul. 9, 2013).

Techno CNC Systems, "NK10SG2 Plasma User Manual," via Internet Archive Wayback Machine, available at https://web.archive.org/ web/20160804181147 /http://support.technocnc.com/ pdf/Techno-CNC-Plasma-NK1 0SG2.pdf (Mar. 2016).

Chaneman99, "CNC Layout Tool," available at https://www.youtube.com/watch?v=e97Y14MNGf (Jul. 13, 2016).

Poulsen, Matthew A., "Concise Description of Relevance," 3rd Party Submission Under 37 CFR 1.290 filed in U.S. Appl. No. 16/775,848 (Jan. 13, 2021).

Amended Answer and Counterclaim, *Automated Layout Technologies, LLC v. Precision Steel Systems, LLC*, case No. 4:20-cv-3127 (D. NE, Feb. 12, 2021).

Catanese, P. & Geary, A., "Post-Digital Printmaking: CNC, Traditional and Hybrid Techniques," pp. 119-128, ISBN 978-1408124949 (A&C Black, 2012).

Suiter Swantz PC, Request for Ex Parte Reexamination under 37 CFR § 1.510, U.S. Pat. No. 10,576,588 (Feb. 25, 2021).

(56) References Cited

OTHER PUBLICATIONS

American Welding Society Forum, "Is There Any Money in Railing Jobs?," available at https://app.aws.org/forum/topic_show.pl?tid=32291 (Jun. 23, 2013).
American Welding Society Forum, "Welding Table Top Thickness," available at https://app.aws.org/forum/topic_showpl?tid=32253 (Jun. 13, 2013).
Thomas Stacey, "Time Lapse Railing, "available at https://www.youtube.com/watch?v+Pneb3JLsZEA (May 22, 2012).
Poulson, Matthew A., Request for Ex Parte Reexamination Under 37 CFR 1.510, U.S. Pat. No. 10,576,588 (filed Aug. 30, 2021) (exhibits omitted).
Wade'o Design.Com, "CNC Router Build," via Internet Archive Wayback Machine, available at https://web.archive.org/web/20170418052710/https://www.wadeodesign.com/design-details.html (Apr. 18, 2017).
Poulson, Matthew A., Request for Ex Parte Reexamination Under 35 CFR 1.510, U.S. Pat. No. 10,576,588 (filed Jun. 2, 2021) (exhibits omitted).
Richard P. Jeffries, Letter to Counsel (Sep. 30, 2021).
Peddinghaus, "Automatic Layout Marking I PeddiWriter (Future of Layout Marking)," available at https://www.youtube.com/watch?=74wN9MpvjrU (Dec. 2, 2014).
Peddinghaus, JT Steel I Fabtech I Peddi-TV, "PeddiWriter Handrail Fabrication I," available at https://www.tube.com/watch?v=5pDNX_PeceY, Nov. 14, 2016 (Nov. 14, 2016).
Kingmetalsinc, "Welding Iron Railings for Beginners," available at https://www.youtube.com/watch?v=loGUdAz4EAM (Sep. 25, 2012).
Mr. Figureitout, "Welding Handrail, Tips for Beginners," available at https://www.youtube.com/watch?v=aBGSVXKAKQY (Nov. 13, 2019).
Arcsoft USA, Mach3 CMC Controller Software Installation and Configuration, Version 3, (Nov. 6, 2008).
Video transcript of an online video entitled "Precision Steel Systems PLS-624", posted at <https://www.youtube.com/watch?v=1AlXiw5TapM> on Apr. 1, 2020.
Suiter Swantz PC, Request for Ex Parte Reexamination, (Jan. 11, 2023).
Craig R. Smith, Plaintiff's Motion For Preliminary Injunction Before Apr. 12, 2023 (Jan. 13, 2023).
Craig R. Smith, Memorandum In Support Of Motion For Preliminary Injunction Before Apr. 12, 2023 (Jan. 13, 2023).
Craig R. Smith, Index Of Evidence In Support Of Plaintiff's Motion For Preliminary Injunction Before Apr. 12, 2023 (Jan. 12, 2023).
Stephen L. Chasse, Declaration of Stephen L. Chasse In Support of Plaintiff's Motion For Preliminary Injunction, With Exhibits (Jan. 13, 2023).
Craig R. Smith, Declaration of Craig R. Smith In Support Of Plaintiff's Motion For Preliminary Injunction, With Exhibits (Jan. 13, 2023).
Craig R. Smith, Plaintiff's Reply In Support Of Motion For Preliminary Injunction (Feb. 10, 2023).
Craig R. Smith, Index Of Evidence In Support of Plaintiff's Motion For Preliminary Injunction Before Apr. 12, 2023 (Feb. 10, 2023).
Craig R. Smith, Declaration Of Craig R. Smith In Support Of Plaintiff's Motion For Preliminary Injunction, With Exhibits (Feb. 10, 2023).
Nathan D. Clark, Letter To ALT Attorneys (Feb. 27, 2023).
Nicholas Donner, Declaration of Nicholas Donner, With Exhibits (Feb. 2, 2023).
Donald Volentine, Declaration of Donald Volentine, With Exhibits (Feb. 2, 2023).
Nicholas Grennan, Declaration of Nicholas Grennan, With Exhibits (Feb. 2, 2023).
Nathan Clark, Declaration of Nathan Clark, With Exhibits (Feb. 2, 2023).
Precision Steel Systems, Precision Steel Systems PLS-624 video transcript, https://www.youtube.com/watch?v=1AIXiw5TapM>.
Declaration of Nicholas Donner, (Jan. 9, 2023).
Arcsoft USA, Mach3 CNC Controller Software Installation and Configuration, Version 3 (Nov. 6, 2008).
Precision Steel Systems, PLS 624 by Precision Steel Systems, https://www.precisionsteelsystems.com, (Oct. 22, 2020).
Memorandum and Order, *Automated Layout Technologies LLC* v. *Precision Steel Systems LLC*, 4:20-cv-03127 (D. NE, Apr. 11, 2024).
Clark, Nathan D., Letter forwarding Memorandum and Order, (Apr. 12, 2023).

\* cited by examiner

FABRICATION LAYOUT DEVICE AND METHOD

RELATED APPLICATIONS

This application claims benefit under 35 U.S.C. § 120 as a continuation of U.S. patent application Ser. No. 17/084,132, filed on Oct. 29, 2020 and titled FABRICATION LAYOUT DEVICE & METHOD, which is a continuation of U.S. patent application Ser. No. 16/775,848, filed on Jan. 29, 2020 and titled FABRICATION LAYOUT DEVICE & METHOD, which is a continuation of U.S. patent application Ser. No. 15/695,294, filed Sep. 5, 2017 and titled FABRICATION LAYOUT DEVICE & METHOD, all of which are hereby incorporated herein by reference in their entireties.

FIELD OF THE DISCLOSURE

This disclosure relates to devices and methods used in the fabrication of articles, and more particularly to devices and methods used to create layouts that guide fabrication processes.

BACKGROUND

Some articles of manufacture are fabricated using manual techniques. For example, conventional techniques used to fabricate railings include laying out individual pieces of a railing onto a surface, such as a table or floor, by hand using chalk, markers, clamps, and/or jigs. Several measurements of the individual pieces relative to one another are usually taken to ensure that the pieces are properly positioned. These measurements can be done using tape measures, rulers, and protractors, so that the pieces can be attached to one another in a particular manner or design. With the various pieces laid out, one can view the assembly and make changes to the position of individual railing pieces before they are attached together.

SUMMARY

One example embodiment of the present disclosure provides a device including a table including a work surface, the work surface being a continuous surface and configured to support a plurality of railing components for fabrication of a railing assembly; a beam located above the work surface and operatively coupled to the table, such that the beam moves relative to the work surface in a first direction; a first motor operatively coupled to the beam and configured to move the beam in the first direction relative to the work surface; an ink dispenser attached to the beam and configured to move along the beam in a second direction different from the first direction, the ink dispenser is further configured to dispense ink onto the work surface of the table; a second motor operatively coupled to the ink dispenser and configured to move the ink dispenser in the second direction relative to the work surface; and a control panel configured to operate the first and second motors to move the beam and the ink dispenser relative to the work surface, and the controller is further configured to operate the ink dispenser to dispense ink onto the work surface of the table in a pattern of the railing assembly. In some cases, the device further includes a plurality of adjustors attached to the table and each adjustor is configured to adjust a position of the beam along the table so that the beam is linear. In other cases, the device further includes a grounding lug attached to the table. In some such cases, the grounding lug is configured to receive electrical energy via the work surface and transfer the electrical energy to ground. In other cases, the pattern of the railing assembly is disposed with dimensions equal to dimensions for the rail assembly. In some other cases, the pattern of the railing assembly is deposited directly onto the work surface of the table. In some cases, the second direction in which the ink dispenser is configured to move is normal to the first direction. In other cases, the ink dispenser moves relative to the work surface in at least two directions. In some such cases, the ink dispenser moves along the work surface in the first direction as the beam is moved relative to the work surface and the ink dispenser moves along the work surface in the second direction as the ink dispenser moves along the beam. In other cases, the beam and the ink dispenser move simultaneously relative to the work surface. In some other cases, the ink dispenser is further configured to deposit ink onto the work surface of the table in a second pattern of the railing assembly. In some cases, the ink dispenser deposits ink on the work surface of the table in multiple patterns for one or more railing assemblies. In some such cases, the multiple patterns are deposited onto the work surface simultaneously.

Another example embodiment of the present disclosure provides a method of fabricating a railing assembly including providing a first pattern of the railing assembly on a work surface of a table; and positioning a plurality of railing pieces along the first pattern on the work surface. In some instances, the method further includes attaching the positioned railing pieces to one another to form the railing assembly; and removing the railing assembly from the work surface of the table. In some such instances, the method further includes providing a second pattern of a second railing assembly on the work surface; positioning a plurality of railing pieces along the second pattern on the work surface; attaching the positioned railing pieces to one another to form a second railing assembly; removing the second railing assembly from the work surface; and removing the second pattern from the work surface. In other instances, the first pattern of the railing is provided by depositing the first pattern onto the work surface using a moveable nozzle. In some instances, the first pattern of the railing assembly is disposed with dimensions equal to dimensions for the rail assembly. In some such instances, the first pattern of the railing comprises a plurality of dotted lines configured in a shape of the railing. In some such instances, the plurality of railing pieces of the railing are positioned over the first pattern of the railing on the work surface. In other instances, the first pattern of the railing assembly is an outline of a railing pattern. In some such instances, the plurality of railing pieces of the railing are positioned within the first pattern of the railing assembly on the work surface. In other instances, the plurality of railing pieces of the railing assembly are positioned within the first pattern of the railing assembly on the work surface. In some other instances, the plurality of railing pieces are welded together while the railing pieces are positioned along the first pattern on the work surface. In yet some other instances, the first pattern is removed from the work surface by polishing the work surface. In other instances, the method further includes removing the railing assembly from the table to expose the first pattern on the work surface of the table. In some such instances, the method further includes removing the first pattern from the work surface of the table.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1A:
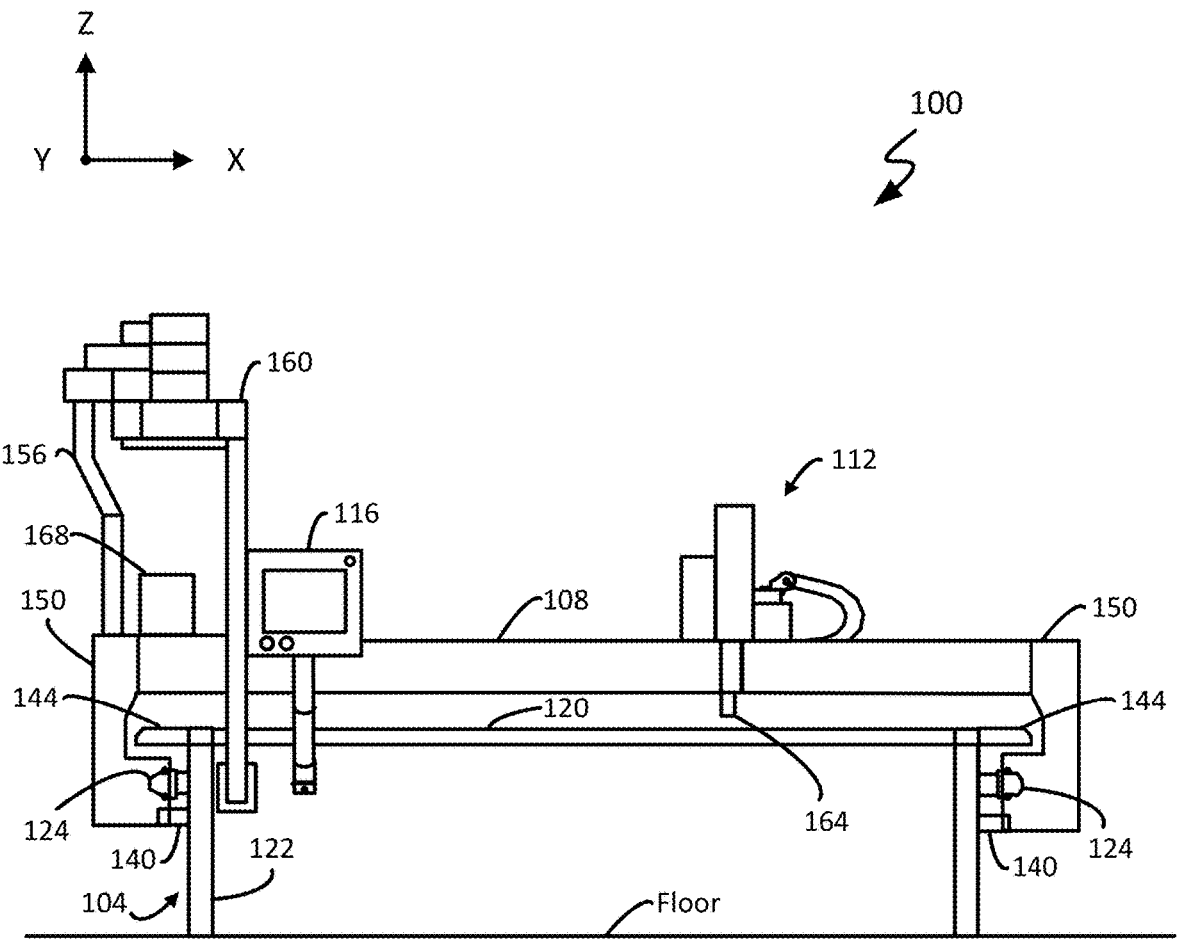
FIG. 1A is an end view of a fabrication layout device configured in accordance with an embodiment of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and devices are disclosed for a fabrication layout device and methods of fabricating a railing assembly therewith. The device includes a table with a continuous work surface on which a railing pattern (e.g., an outline) is provided to guide fabrication of a railing assembly. The pattern allows railing pieces to be quickly and easily aligned prior to fabrication of the railing assembly without the necessity of taking multiple measurements to ensure proper positioning of the railing pieces. In addition, the railing pattern provides a visual cue to ensure the railing pieces are properly positioned relative to one another prior to assembling them.

In some embodiments, the railing patterns are created using an ink dispenser system that is disposed on a beam located above the work surface. The beam is configured to allow the ink dispenser system to move relative to the work surface in a first direction (e.g., in the y-direction). The ink dispenser system is configured to move along the beam in a second direction (e.g., in the x-direction) different from the first direction. As the ink dispenser system is moved along the work surface (e.g., in the x-direction or y-direction or both) ink is deposited onto the work surface of the table in the pattern of the desired railing assembly. Once the pattern is completed, the railing components can be quickly positioned onto the work surface and attached to one another. Once the railing assembly is fabricated, the pattern can be easily removed from the work surface by hand (or by mechanical device) to ready the work surface to receive another railing pattern for the next railing assembly.

General Overview

As described above, fabrication of railings, such as metal railings, is a time consuming and expensive process. Often times, the same measurement is taken multiple times to ensure that the layout is accurate and no movement between pieces has occurred since the previous measurement. Movement of any one railing piece can cause several other railing pieces to be improperly located, and thereby cause significant re-work of the layout and/or railing assembly itself. In some instances, an entire railing assembly is scrapped and remade because the railing pieces were misaligned prior to joining them together.

Thus, and in accordance with an embodiment of the present disclosure, techniques and devices are disclosed for fabrication layout device and methods of fabricating a railing assembly. The device includes a table with a continuous work surface on which a railing pattern is provided to guide fabrication of a railing assembly. A continuous work surface is a surface that is does not include openings or holes within the surface that would prevent the formation of the railing pattern thereon. For example, in one embodiment, the work surface is a sheet of carbon steel in the form of a rectangular cuboid having a length of y, a width of x, and height of z. A railing pattern can be any group of markings that when deposited or otherwise placed on the work surface indicate particular arrangement of railing pieces to form a railing assembly. In some examples, the railing pattern is an outline or a line diagram of a portion of or an entire railing assembly. The size of the pattern may be proportional to the actual size of the railing assembly so that railing pieces can be positioned onto the pattern relative to one another to form the railing assembly. In some examples, the pattern has dimensions that are equal to or substantially similar to dimensions of the railing assembly to be fabricated. In other examples, the pattern may include dimensions that are slightly larger than the railing assembly to be fabricated so that pattern can still be seen while the railing pieces are positioned along the pattern. By using an actual size railing pattern, the time for laying out a railing assembly can be reduced from a few hours to less than one half hour, for even complex or ornamental patterns.

In some examples, the work surface is configured to support a plurality of railing components along with other tooling or jigs used to position the individual railing pieces while they are assembled together on the work surface. In some examples, the work surface is one single piece of material, such as a plate of carbon steel, that can be reused multiple times to create different railing assemblies, as will be described further herein. In other examples, the work surface is manufactured from multiple pieces that are attached to one another such that the surface is a flat surface. The work surface, in some examples, is sized to allow two or more railing assemblies to be fabricated thereon simultaneously. In such examples, the fabrication layout device can deposit two or more railing assembly patterns onto the work surface either simultaneously or one after another. With the patterns provided on the work surface, multiple fabricators can work at the table to create multiple railing assemblies at one time. In some examples, the table further includes a grounding lug, so that fabricators can safely weld railing pieces together while the pieces are positioned on the work surface. The grounding lug is configured to receive electrical energy (e.g., an arc strike) via the work surface and transfer that electrical energy safely to ground, thereby preventing harm to fabricators or equipment on or near the table.

In some examples, the device further includes a beam located above the work surface. The beam is configured to support an ink dispenser system and guide it relative to the work surface in a first direction (e.g., in the y-direction). In one example, the beam is operatively coupled to the table, such that the beam is moved along the guide rails located on opposing sides of the table using a combination of motors and drive mechanisms. The movement of the beam is controlled using one or more encoders. The beam is also configured to allow the ink dispenser system to move along it in a second direction (e.g., an x-direction), as described further herein. Thus, the ink dispenser system can move in two directions relative to the work surface. The ability of the ink dispenser system to move in two different directions allows the ink dispenser system to deposit ink at coordinate locations (e.g., (x,y) coordinates) upon the work surface.

The ink dispenser system is configured to deposit ink onto the work surface of the table in the form of a pattern of the railing assembly. In one example, the ink dispenser system includes a movable nozzle that is configured to move linearly in a vertical direction relative to the work surface (e.g., a z-direction). The moveable nozzle can be actuated, for example by air or hydraulic pressure, so that the nozzle is positioned at a distance from the work surface so that ink can be deposited on the surface in a clear and defined manner (i.e., not blurry or appearing diffuse). The ink dispenser system also includes an ink reservoir configured to hold a supply of ink that can be transferred to the nozzle, for example using a fluid pump. The ink dispenser system can be slideably attached to the beam so that the nozzle can be positioned laterally along a length of the beam.

In an embodiment of the present disclosure, methods for fabricating a railing assembly using the fabrication layout device are disclosed. The method includes providing a first pattern of the railing assembly on a work surface of a table. The first pattern can be selected using a graphical user interface (GUI) displayed within a touch screen display of a control panel of the fabrication layout device. The pattern can be selected from a database of railing assembly patterns or imported from another application (e.g., a Computer-Aided Drawing (CAD) software application). Thus, standard or custom railing assembly patterns can be selected depending on a given application. With the railing pattern selected, the fabrication layout device can be operated using the control panel to dispose the first pattern of the railing assembly onto the work surface of the table, as previously described herein.

In some examples, the method further includes positioning a plurality of railing pieces along the first pattern on the work surface. In one example, the railing pattern is in the form of an outline of an actual size railing assembly. The railing pieces are positioned relative to one another within the outline so that each railing piece is surrounded or otherwise encircled by the pattern. The railing pattern provides a visual cue regarding the proper positioning of each railing piece. Thus, measurements between railing pieces are not needed because the position of each piece relative to adjacent pieces is defined by the pattern. In other examples, the railing pattern can be a line diagram of the railing assembly or be a collection of markings (e.g., crosses or corner markings) that indicate points of intersection and/or other critical locations. In such cases, some physical measurements may need to be taken to properly position one or more of the railing pieces and, thus, some examples of the method include taking and marking physical measurements.

In some examples, the method also includes attaching the positioned railing pieces to one another to form the railing assembly. In one example, the railing components are manufactured from metal, such as cast iron or carbon steel, and attached to each other using fabrication techniques, such as welding. The railing assembly can be partially or completely assembled while the railing pieces are positioned on the work surface. The method may further include removing the first pattern from the work surface. The first pattern is removed from the work surface so that subsequent patterns can be provided thereon. The pattern can be removed by hand or with a mechanical device (e.g., a hand-drill with a polishing wheel) using a polishing compound or detergent based cleaner.

Example Fabrication Layout Device

Figure 1B:
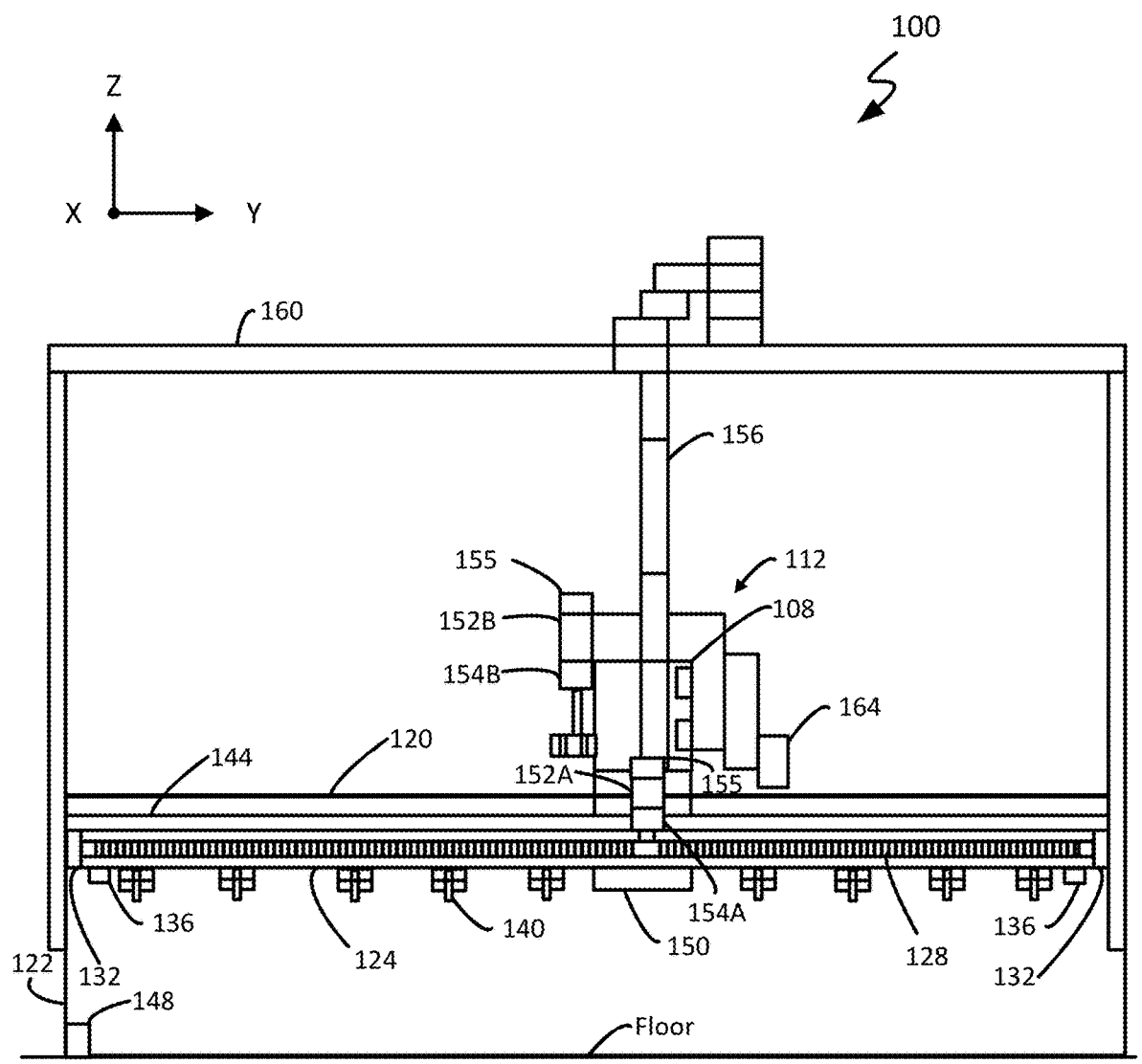
FIG. 1B is a side view of a fabrication layout device of FIG. 1A, in accordance with an embodiment of the present disclosure.
Figure 1C:
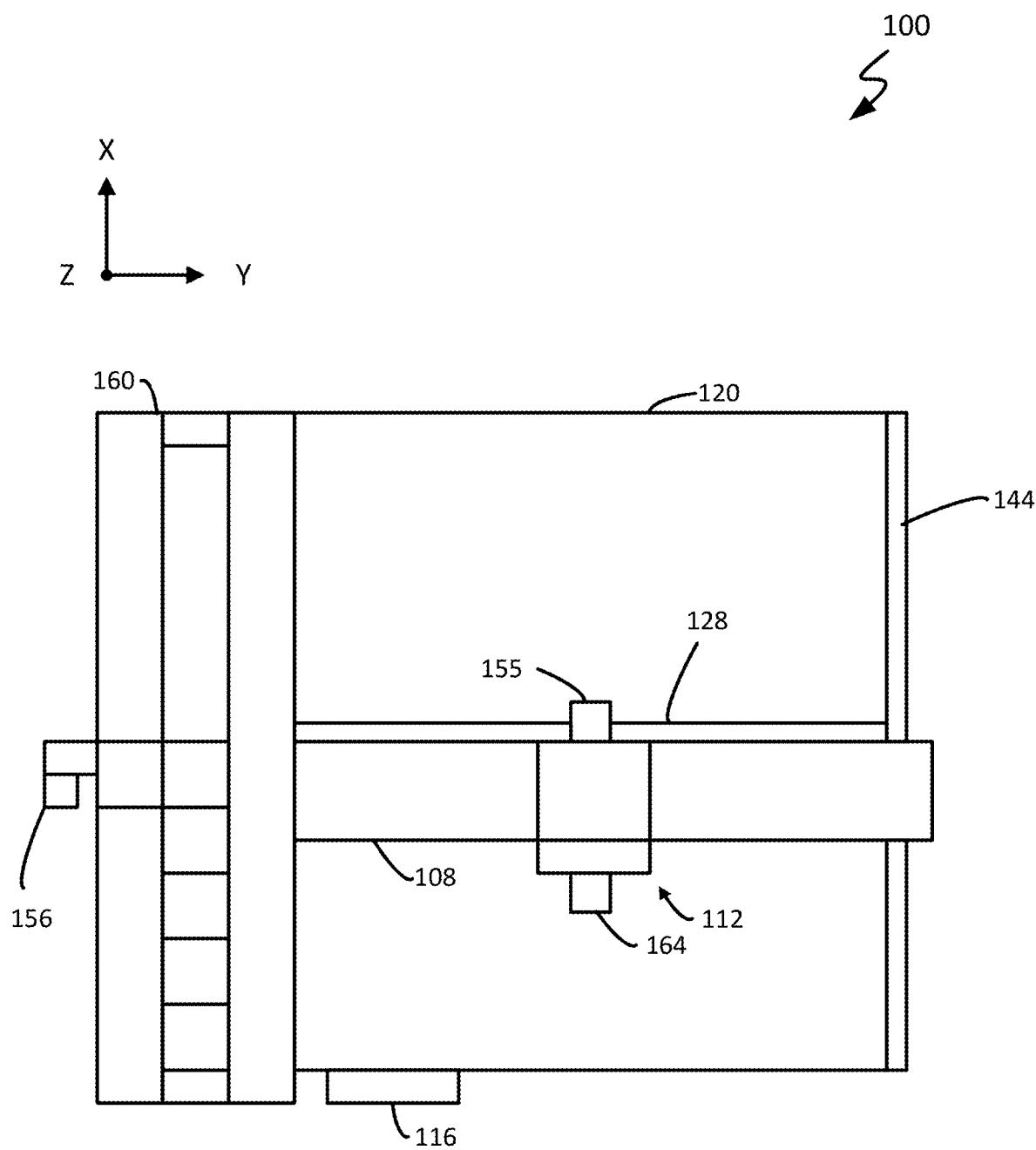
FIG. 1C is a top view of a fabrication layout device of FIG. 1A, in accordance with an embodiment of the present disclosure.

FIG. 1A is an end view of a fabrication layout device 100 configured in accordance with an embodiment of the present disclosure. FIG. 1B is a side view of a fabrication layout device 100. FIG. 1C is a top view of a fabrication layout device 100. The fabrication layout device 100 includes a table 104, a beam 108, an ink dispenser system 112, and a control panel 116.

The table 104 is a rigid structure that does not flex when a load is applied to it. This feature enables railing components to be laid out relative to one another on the table 104 prior to forming a railing assembly from the railing components. Flexing of the table 104 can cause the pattern deposited thereon to be improperly made and/or affect the positioning of railing pieces positioned thereon. In addition, the table 104 is designed to support railing components, tooling, and even fabricators as the individual components are physically joined to one another. Note, due to table's robust design and construction the table 104 can weigh as much as 9,000 pounds. In one example, the table 104 includes a work surface 120, a base 122, guide rails 124, adjustors 140, guards 144, a grounding lug 148, beam supports 150, motors 152A and 152B, gear boxes 154A and 154B, and cable tray 160.

Figure 2A:
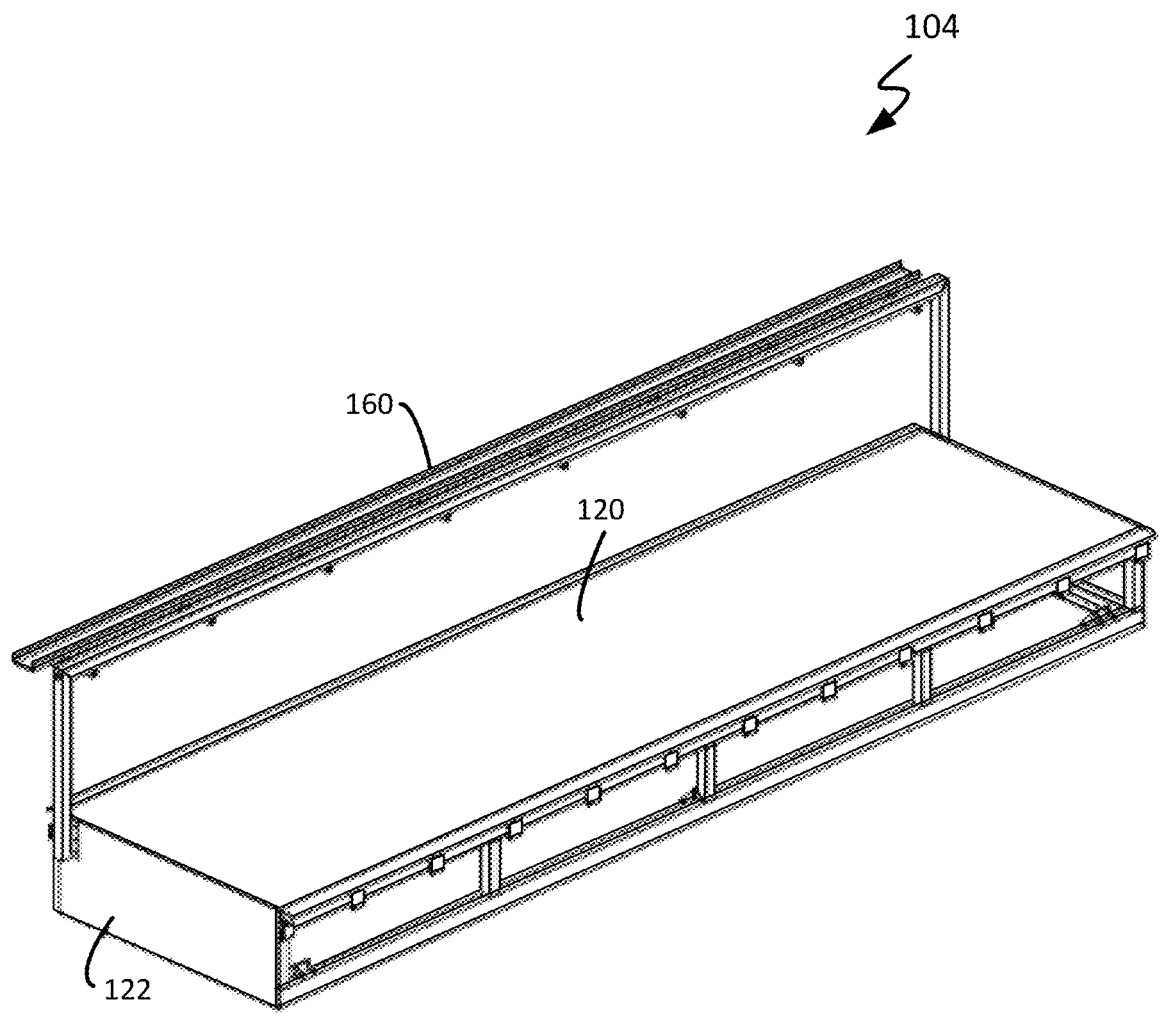
FIG. 2A is a perspective view of a table of the fabrication layout device, in accordance with an embodiment of the present disclosure.

The table 104 includes a work surface 120 on which railing pieces are positioned and arranged prior to joining the pieces to one another. Once positioned relative to each other, the railing pieces are physically assembled with one another (e.g., welded together) while on the work surface 120. Generally speaking, the work surface 120 can be of any suitable dimensions so long as the surface 120 is sufficiently sized to allow a railing pattern to be deposited and a physical railing to be constructed thereon. In one example, the work surface 120, as shown in FIG. 2A, is a single piece of material and is recessed within the base 122, such that the surface 120 is even with a top surface of the base 122. In other applications, the work surface 120 can be made from multiple pieces or positioned above the base 122 (or both). Materials, such as carbon or stainless steel plate, can be used to manufacture the work surface 120. The work surface 120 can also be manufactured in a variety of shapes and sizes, depending on a given application. In one example, the work surface 120 is manufactured with a rectangular shape with dimensions of 7.5 feet in width, 30 feet in length, and ¾ of inch in thickness. The weight of the work surface 120 having such dimensions can range from 6900 to 7100 pounds. In some examples, the work surface 120 can have a thickness of ⅛, 3/16, ¼, 5/16, ⅜, or 7/16 inches. In addition, the work surface 120 is a substantially flat surface. Discontinuities or raised areas in the work surface 120 may adversely affect the layout and/or fabrication of the railing assembly. In one example, the work surface 120 has a flatness, such that placing a 36-inch rule along surface 120 creates a gap of up to 5/16 inches between the rule and surface 120. Numerous other work surface configurations will be apparent in light of the present disclosure.

Figure 2B:
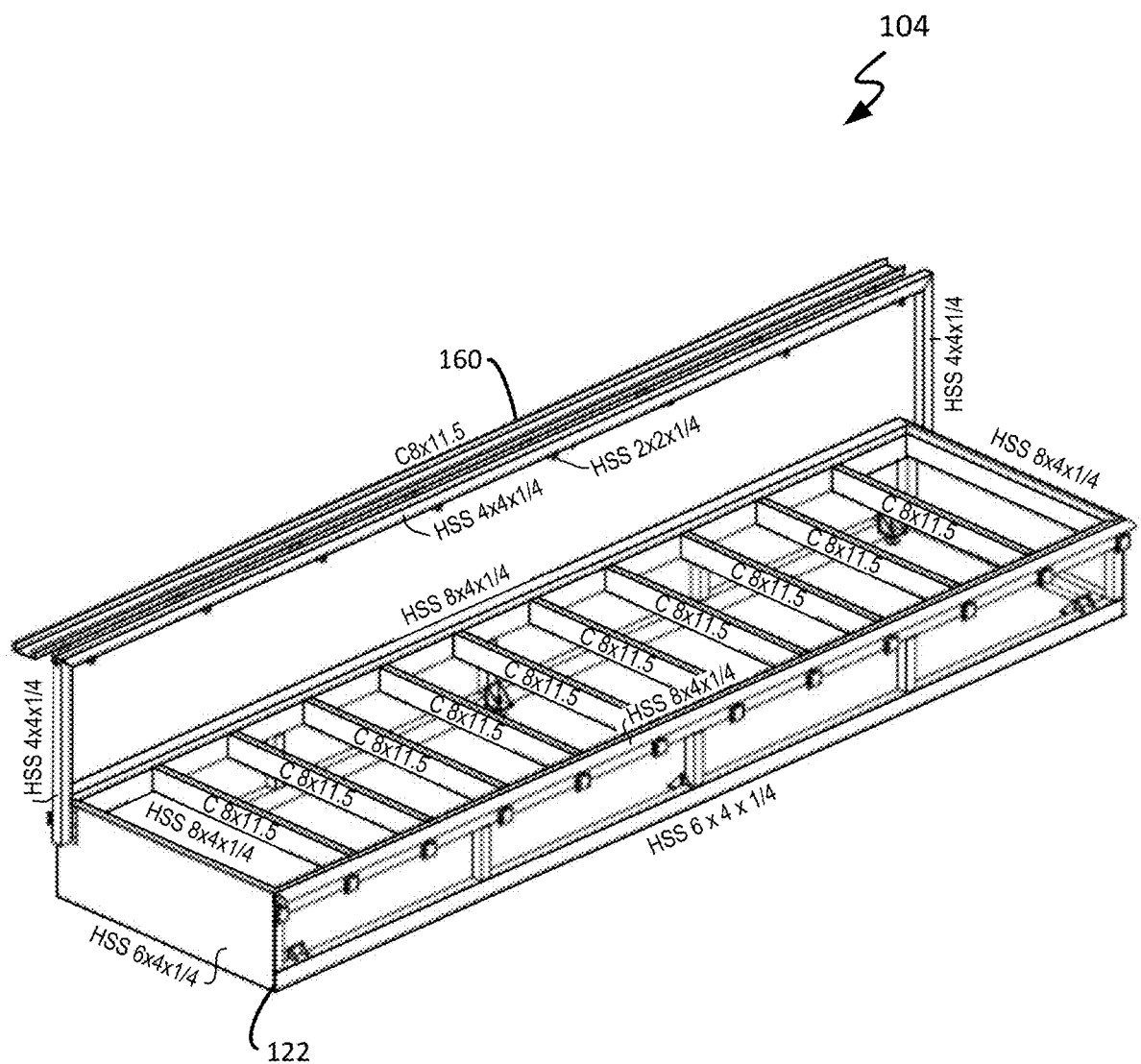
FIG. 2B is a perspective view of the table shown in FIG. 2A with the work surface removed, in accordance with an embodiment of the present disclosure.

Attached to the work surface 120 is a base 122 that supports a number of components of the fabrication layout device, including the work surface 120. Thus, the base 122 is robustly designed so that its mechanical properties are sufficient to properly support the work surface 120 and other components attached thereto. In one example, the base 122, as shown in FIG. 2B, is made from hollow structural sections (HSS) (e.g., 6×4 and 8×4 rectangular sections) and channel pieces (e.g., C8 channel). In particular, the hollow structural sections can be manufactured from steel and having a thickness of ¼ inch and a nominal weight of 15.62 lb/ft. In other examples, the sections can be square or round sections having a thickness in the range of 3/16 to ½ inch. The channel pieces, in this one example, can be structural channel manufactured from carbon steel and including dimensions of 8 inches in height, 2.260 inches in flange width, 0.220 inches in web thickness, and a nominal weight of 11.5 lb/ft. The channel pieces can be attached to an inside surface of the hollow structural sections using rivets or bolts or by welding. As can be seen, the channel pieces are unitary pieces that span the distance between the interior surfaces of the beams of the base 122 and are positioned uniformly along a length of the base 122. In some examples, the channel pieces are positioned parallel to one another along the length of the base 122 at a distance of 2 feet and 8 inches. In other examples, the channel pieces are positioned relative to one another at a distance ranging from one to three feet. The base 122 includes roughly the same dimensions as the work surface 120 (e.g., 29 feet, 4.25 inches in length and 7 feet, 5.25 inches in width). The base 122 may have a height sufficient to position the work surface 120 at a convenient height above the floor at which a person can work thereon. In one example, the base 122 can position the work surface 120 at a height of approximately 32 inches above the floor. In other examples, the work surface 120 can be at a height between 26 and 36 inches above the floor.

The table 104 also includes guide rails 124 configured to guide the movement of the beam 108 along the work surface 120 in a first direction (e.g., y-direction). In general, the guide rails 124 are attached to opposing sides of the table 104 and together form a track on which the beam 108 moves. The guide rails 124 can be manufacture from materials, such as aluminum, carbon steel, or stainless steel. In one example, the guide rails 124 include a gear rack 128 disposed on the length of each guide rail 124. The gear racks 128 are configured to engage a pinion gear attached to a gear box, as will be described in more detail below. The guide rails 124 may also include mechanical and/or electrical interlocks to prevent the beam 108 from moving off guide rails 124. Particularly, on each end of the guide rails 124, are mechanical stops 132 or limit switches 136 configured to prevent the pinion from moving off the gear rack 128. In some instances, both mechanical and electrical interlocks are located at each end of the guide rails 124 in case there was a loss of power or failure of a mechanical stop. The mechanical stops 132 can be any physical structure or device capable of preventing movement beam 108 along the guide rail 124. In one example, the mechanical stops 132 are a plate with an adjustable bumper disposed thereon. Limit switches 136, such as proximity switches, can be also be used to prevent movement of the beam 108 along the guide rail 124. In general, a proximity sensor or switch 136 detects the presence of an object without physical contact between the switch 136 and the object. Upon detecting the object, the limit switch 136 transmits a signal to electrically disable the object from moving in the direction of switch 136. In one example, the limit switch 136 is an inductive proximity sensor. In other examples, the limit switch 136 can be a capacitive or photoelectric sensor.

The guide rails 124 are adjustable using a plurality of adjustors 140 attached to the base 122. Particularly, the adjustors 140 adjust the position of a portion of the guide rail 124 in which they contact to ensure that the guide rail 124 is straight along its entire length. Any flexing, bending, waviness, or distortion of the guide rail 124 can cause the pinion gear of the motor to bind with the gear rack 128, and thus slow or otherwise stop the movement of the beam 108. In one example, the adjustors 140 are a number of steel plates welded to the base 122. Within each plate is a threaded hole to receive a fastener, such as a bolt. The bolt is threaded into the hole within the plate so that it contacts a bottom side of the guide rail 124. The contact between the bolt and guide rail 124 causes the guide rail 124 to move upward, and thus raising that portion of the guide rail 124. The position of that portion of the guide rail 124 can be adjusted by threading the bolt into or out of the plate, depending on a given application.

Positioned above each of the guide rails 124 are guards 144 that prevent debris from falling onto the guide rails 124 during fabrication of the railing assembly and to prevent access by persons or objects while the beam 108 is being moved along the guide rails 124. In one example, the guards 144 are positioned above the guide rails 124 and removably attached to the base 122 using fasteners, such as bolts or screws. The guards 144 can be manufactured from materials, such as ¼ inch thick diamond plate stainless steel. In other examples, the guards 144 can be manufactured from carbon and stainless steel. In this example, the guards 144 have a length of approximately 4 four inches. In other examples, the guards 144 can be longer or shorter depending on the off-set distance of the guide rails 124 from the base 122.

The table 104 further includes a grounding lug 148 configured to transfer electrical energy received by the work surface 120 (e.g., an arc strike) to ground. The grounding lug 148 allows the railing assembly to be safely fabricated on the work surface 120 without risk of electrical shock caused by an unintended transfer of electrical energy from tooling, such as a welding machine, to the surface 120. In general, a grounding lug provides an electrical path in which the flow of electricity experiences the least resistance. In one example, the grounding lug 148 is an electrical connector that made of out of conductive material, such as copper. The grounding lug 148 is attached to a surface of the base 122 with a fastener (e.g., a bolt or cap screw). In addition, the grounding lug 148 is attached to the base 122 such that there is sufficient contact between the base 122 and lug 148 (e.g., metal to metal contact) to allow electrical energy to transfer from one to the other. Attached to the grounding lug 148 is a grounding wire that is connected to ground.

The table 104 also includes beam supports 150 that operatively couple the beam 108 to guide rails 124. In one example, the beam supports 150 are manufactured from materials, such as carbon steel, stainless steel or aluminum. Each beam support 150 is configured to receive an end of the beam 108, such that the beam is fixed to the supports 150. The beam 108 can be attached to the beam support 150 using fasteners and/or mechanical clamps. The lower end of each beam support 150 is configured to engage guide rails 124 to maintain the beam 108 at fixed distance above the work surface 120 and allow the support 150 to move along the guide rails 124. In this one example, the beam support 150 may include one or more linear bearings that are configured to ride or slide along a track of the guide rails 124. Attached to one of the beam supports 150 is a cable conduit 156. The cable conduit 156 carries or otherwise supports electrical cables needed to power electrical components positioned on the beam 108. The cable conduit 156 maintains the cables together and protects them from physical damage. In one example, the cable conduit 156 is made out of sheet metal. The conduit 156, in this instance, has a length of 5 feet and width of 6 inches. The cable conduit 156 receives cabling from the cable tray 160, as will be described further herein.

The beam supports 150 move relative to the work surface 120 using motors and gear boxes. For instance, within each of the beam support 150 are a motor 152A and a gear box 154A to move the beam support 150 and beam 108 linearly along a length of the table 104. Other components, such as ink dispenser system 112, also move using motors and gearboxes. In particular, the ink dispenser system 112 moves along beam 108 using motor 152B and gear box 154B. The motor can be any type of motor that is of suitable size to move components on which it is attached. In one example, the motor is a synchronous servomotor. In particular, the motor can be a brushless three-phase AC motor. In other examples, the motor can be a hydraulic or pneumatic motor. Attached to the motor is a gear box, such as a low-backlash planetary gearhead, configured to increase torque provided by the motor. Attached to an output shaft of the gearbox is a pinion gear configured to mesh with or otherwise engage the gear rack 128.

The table 104 further includes a plurality of encoders 155 to determine the position of movable components, such as beam supports 150 and ink dispenser system 112. The encoders 155 prevent damage to table components caused by misalignment of movable components, such as the beam supports 150, during operation. In one example, the encoders 155 are rotary encoders that convert angular position or motion of a shaft into a signal. The signal generated by the encoder to can be transmitted to the control panel 116 for processing. The signal is processed to determine any one of speed, distance, or position, of the component associated with the encoder (e.g., motor).

The table 104 also includes a cable tray 160 to support cabling connected to components attached to the beam supports 150 and/or beam 108. In addition, the cable tray 160 also guides the cabling as the beam 108 moves along the work surface 120. In one example, the cable tray 160 is made from 6×4 carbon steel square tubing. The cable tray 160 is positioned above the beam supports 150 and attached to the base 122 at both ends. The cable tray 160 is located above the table 104 so that fabricators can stand adjacent to the table 104 as they fabricate a railing assembly positioned on the work surface. In this one example, the cable tray 160 is positioned approximately 7 feet above the floor, such that a person can comfortably stand beneath the tray 160. In operation, as the beam 108 is moved along the work surface 120 (e.g., in the y-direction), the cabling is either placed into or removed from the cable tray 160, depending on direction in which the beam 108 moves.

The fabrication layout device 100 further includes a beam 108 on which the ink dispenser system 112 is mounted thereto. The beam 108 supports all or a portion of the ink dispenser system 112 in position above the work surface 120 of the table 104. In addition, the beam 108 also guides the ink dispenser system 112 as it moves across the work surface 120 in a second direction different from the first direction (e.g., x-direction). In one example, the beam 108 is an aluminum beam with a length of approximately 7.5 feet. The beam 108 includes a track on which the ink dispenser system 112 moves along. The beam 108 also includes a gear rack 128 similar to gear rack 128 on guide rails 124. The gear rack 128 interfaces with a pinion gear located on a motor 152B attached to the ink dispenser system 112 to move the dispenser system 112 along the track of the beam 108, as will be described further herein.

The ink dispenser system 112 is configured to dispense ink onto the work surface 120 of the table 104. The ink from the ink dispenser system 112 can be deposited onto the work surface 120 in a pattern, such as an outline of a railing assembly. The pattern can be used to quickly and efficiency layout the components of the railing assembly relative to one another without necessitating multiple measurements between components, as will be described further herein. The ink dispensing system 112 includes a nozzle 164 and an ink reservoir 168. The nozzle 164 is configured to deposit ink onto the work surface 120 of the table 104. In one embodiment, the nozzle 164 is pneumatically operated. In particular, the nozzle 164 is moved in contact with or otherwise adjacent to the work surface 120 in response to an air input. The nozzle 164, in some examples, can remain at a constant distance above the work surface 120 while ink is deposited onto the surface 120. When the air input is removed, a spring attached to the nozzle 164 causes it to move away from the work surface 120 to its initial position above the surface 120. The ink dispenser system 112 also includes an ink reservoir 168 to hold a supply of ink. In one example, the reservoir 168 is a plastic container capable of holding a one or two gallons of ink. The reservoir 168 can be located adjacent to the nozzle 164 on the beam 108 or at one of the beam 108. No matter its location, the reservoir 168 may include a pump to move the ink to the nozzle 164.

The fabrication layout device 100 further includes a control panel 116 configured to allow an operator to control the device 100. In one example, the control panel 116 is a panel personal computer (PC) with a motherboard including memory, a processor, and a heat sink. The control panel 116 may also include a memory, such as volatile or non-volatile memory, to store electronic files, such as files of a railing pattern database. Within the control panel 116 is a display, such as a 15, 19, or 24 inch display, configured as either a touch screen or non-touch screen display. The display is configured to present a GUI for operating or otherwise controlling the function of the fabrication layout device 100. The GUI enables an operator to select a particular pattern to be deposited onto the work surface 120. The patterns can be selected from a database of patterns or can be imported from another application (e.g., a CAD software application). Moreover, the GUI is configured to allow an operator to adjust the operation of the fabrication layout device 100. Using the GUI, the operator can adjust one or more characteristics of the device 100 to improve pattern quality or adjust the amount of time to create a pattern. Characteristics that may be adjusted via the GUI include the amount of ink deposited onto the work surface 120 (e.g., thickness of the lines of the pattern), the speed at which components move (e.g., the ink dispenser system 112 and beam 108), and the location on the work surface in which the pattern is made. In some instances, the control panel 116 may be configured with a track pad, keyboard, or other input device.

The display may also include one or more function buttons. The functions buttons may be physical buttons located adjacent to the display or virtual buttons of the GUI (or both). In one example, the display includes a power button to turn on the fabrication layout device 100. Additional function buttons may include operating buttons (e.g., start/stop buttons) that control the operation of the fabrication layout device 100. The control panel 116, in some examples, may also include an emergency stop switch. In one example, the emergency stop switch is push-button switch that turns off electricity to the fabrication layout device 100 upon receiving being actuated. Numerous other control panel configurations will be apparent in light of the present disclosure.

Operation of Fabrication Layout Device

The fabrication layout device 100 is configured to deposit or otherwise dispense ink onto the work surface 120 of the table 104 in a pattern, such as a railing design, on which railing pieces are placed on to assist with railing assembly fabrication. Utilizing the control panel 116, an operator can select or otherwise load a railing pattern to be produced onto the work surface 120. In some cases, this can be done remotely via a network (e.g., a wired or wireless network) connected to the control panel 116 and a server or computing device (e.g., a tablet or laptop computer). With the pattern selected, the device 100 is activated, using the control panel 116. If the device 100 was previously turned-off, then the device 100 can reset the encoders 155 by first positioning the beam 108 and ink dispenser system 112 to a known location (e.g., one end of the work surface 120 or beam 108) and then resetting the encoders 155 to a known value (e.g., zero) associated with that location. In one example, the beam 108 and ink dispenser system 112 can be moved individually or together, in response to input received via the control panel 116, to a location at which the encoders 155 can be reset. In other instances, the beam 108 and ink dispenser system 112 can be automatically positioned by execution a pre-programmed routine (or sub-routine).

With encoders 155 reset, the beam 108 and ink dispenser system 112 can be positioned anywhere along the work surface 120 to begin creating a railing pattern made of ink on the work surface 120. To do so, the control panel 116 transmits one or more signals to the motors so that the ink dispenser system 112 is positioned at coordinate locations (e.g., (x,y)) along the work surface 120. As the beam 108 and ink dispenser system 112 move, the encoders 155 generate position data (e.g., a count or number of clicks) that can be used to determine a position of the ink dispenser system 112 relative to a previous position or a reference point on the work surface 120. A reference point is a point within the work surface 120 that is used to determine a coordinate position of the ink dispenser system 112. The reference point can be the same as the known location at which the encoders 155 were reset. The reference point can also be a particular location within the work surface 120, such as a point along a central axis. The signal generated by the encoders 155 can be transmitted to control panel 116 to determine a next component movement or monitor operation of the device 100. For example, the encoders 155 can be configured to ensure that the beam supports 150 remain parallel with one another as they move along the guide rails 124. If the beam supports 150 become displaced from one another beyond a particular tolerance value (e.g., 1/32, 1/16, 1/8 of an inch), then one or both the pinion gears attached to the motors may bind, and thus prevent the beam supports 150 and beam 108 from moving. The encoders 155 prevent the beam supports 150 from becoming misaligned with one another by continuously determining the position of each support 150. This position data can be sent to one or more processors of control panel 116, in which the data can be analyzed to determine if there is a difference in position between each of the beam supports 150. If there is a difference, then the control panel 116 is configured to determine whether the difference is within an acceptable range. A misalignment outside the acceptable range can cause the device 100 to stop operating to prevent damage to the one or more components of the device 100.

In some examples, the control panel 116 is configured to process the signal from the encoders to send commands to move components or deposit ink (or both) along the work surface 120. When executing according to this configuration, one or more processors of the control panel 116 analyze the selected pattern to determine a sequence of movements for each of the beam 108 and ink dispenser system 112. The sequence of movements can be continuous or a series of steps. The beam 108 and ink dispenser system 112 move in series or simultaneously to produce the pattern on the work surface 120 using motors that receive signals and/or commands from the one or more processors of the control panel 116. For example, the beam 108 and dispenser system 112 can be moved in series with one another, such that the beam 108 is moved along the work surface 120 first, and then the ink dispenser system 112 is moved along the beam 108. In other examples, the ink dispenser system 112 is moved along the beam 108, and then the beam 108 is moved along the work surface 120 to deposit the ink onto the surface 120. In some instances, both the beam 108 and ink dispenser system 112 move contemporaneously. Ink can be deposited onto the work surface 120 during or upon completion of a component movement. For instance, ink can be deposited while the beam 108 moves, but the ink dispenser system 112 is stationary relative to the beam 108. In other instances, the ink dispenser system 112 moves along beam 108 as it deposits ink onto the work surface 120, but beam 108 is stationary. In yet other instances, both the beam 108 and ink dispenser system 112 move while ink is deposited onto the work surface 120. In such an instance, the beam 108 moves in a first direction (e.g., a y-direction) and the ink dispenser system 112 moves in a second direction (e.g., x-direction) relative to the beam 108. In yet other instances, the nozzle 164 of the ink dispenser system 112 may also move relative to the beam 108 in a third direction (e.g., z-direction). In some examples, the one or more processors analyze the selected pattern to determine a sequence that has the least number of component movements to deposit ink onto the work surface 120. In other examples, the pattern is analyzed to determine a sequence of movements that uses the least amount of electricity based on the configuration device components.

In addition, limit switches 136 prevent movement of the beam 108 or ink dispenser system 112 outside an operating range of motion. In particular, the limit switches 136 are configured to generate a signal when the beam 108 or ink dispenser system 112 is within a predefined range. The limit switch 136 transmits the signal to the control panel to stop operation of the detected component. The operating range prevents operating the beam 108 and ink dispenser system 112 at their extreme ends of travel at which component performance and reliability can be reduced. In one example, the operating range is a portion of an area within the work surface 120 (e.g., area about the center of the work surface 120). The operating range can be defined by the position of the limit switches 136 along the table 104. In response to receiving a signal, the limit switch 136 is configured to send an input to the control panel 116 to prevent the detected component (e.g., the beam 108 or ink dispenser system 112) from moving further in that direction. If there is a failure of the limit switch 136, then the mechanical stops 132, located at each end of guide rails 124, can physically prevent further movement of the component.

The device 100 can deposit one or more railing patterns onto the work surface 120, depending on the size of the individual patterns and the surface 120. Multiple patterns can be deposited onto the work surface 120 simultaneously and one after another, depending on the application. Once deposited, multiple railing assemblies can be fabricated concurrently on a single table 104 using each pattern on the work surface 120. The patterns are made using solid or dotted ink lines. Dotted lines may be preferable because less ink can be used to create the pattern without adversely affecting the appearance of the pattern on the work surface 120. The pattern can be an outline of a railing assembly. Generally speaking, an outline is a line or set of lines that enclose or indicate the shape of an object. The outline is the same size of an actual railing assembly to be fabricated so that railing pieces can be placed on the outline to form the railing assembly. The outline may be a partial or complete outline of the railing assembly. For example, a partial outline may include lines at the ends of individual pieces and/or at the intersection of two or more pieces. In such an example, the outline may not include lines that correspond to portions of railing pieces between the ends of each piece. In other examples, single lines can be used to form the pattern on the work surface 120. For instance, the pattern can include single lines that represent each piece of the assembly. The pieces are positioned onto the work surface 120 so that they are centered on each line of the pattern. In other instances, the single lines of the pattern can be offset, such that each piece of the railing assembly is positioned with one edge of the piece positioned over the line. Numerous other pattern configurations will be apparent in light of the present disclosure.

Methodology of Railing Assembly Fabrication

Figure 3:
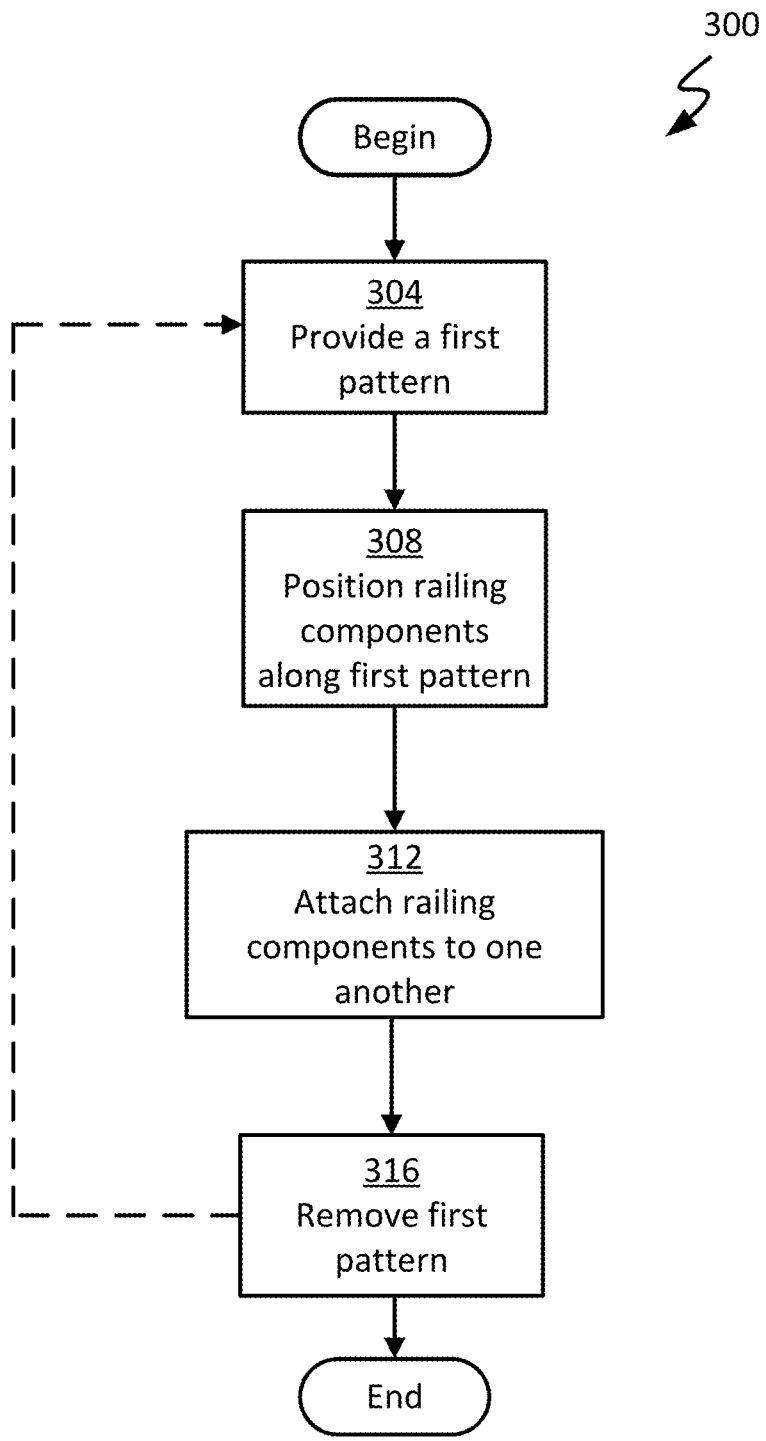
FIG. 3 is a flow chart illustrating a method for fabricating a railing assembly, in accordance with an embodiment of the present disclosure.
Figure 4A:
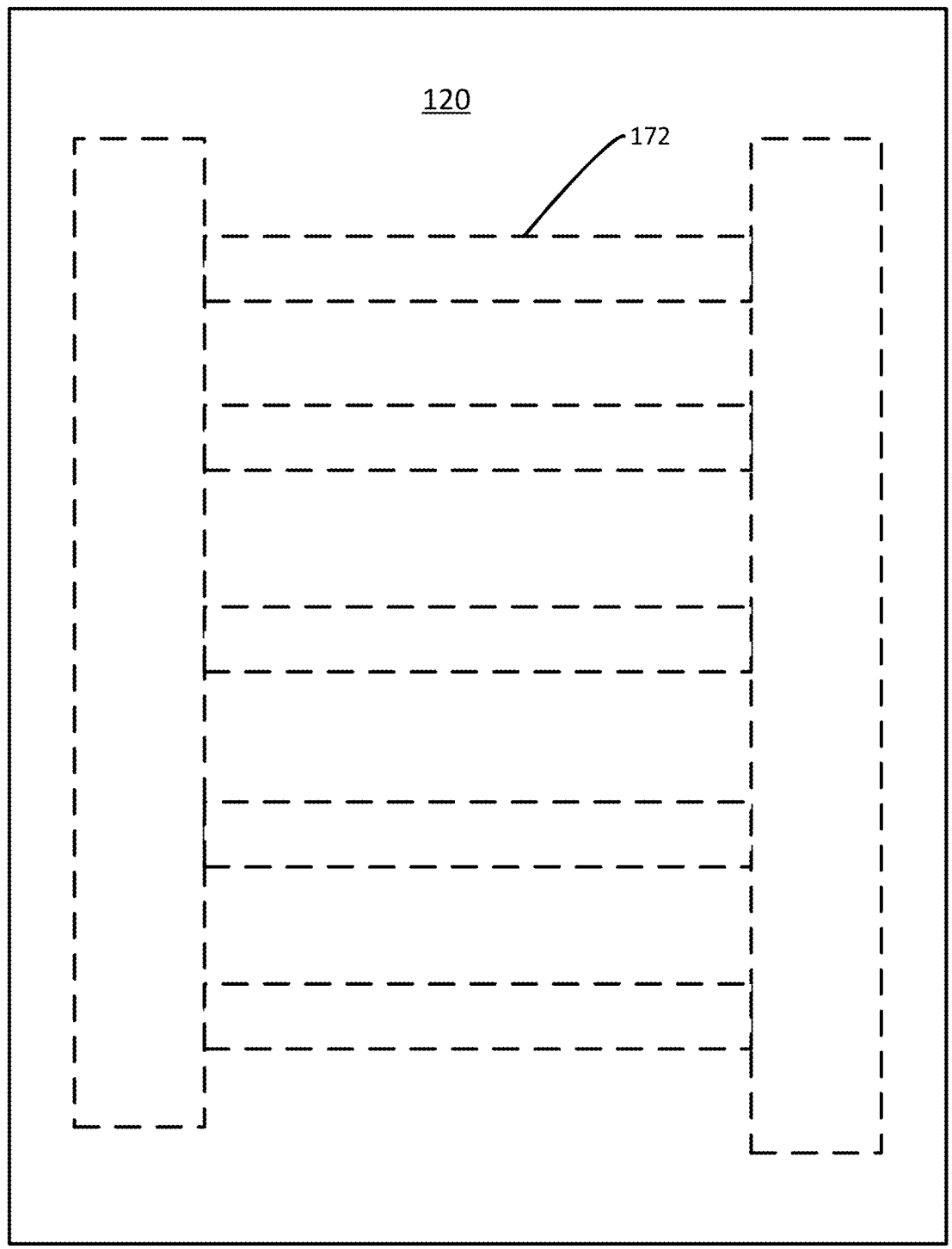
FIG. 4A is a schematic view of a pattern deposited onto work surface of the fabrication layout device, in accordance with an embodiment of the present disclosure.

FIG. 3 is a flow chart showing a method 300 for fabricating a railing assembly, in accordance with an embodiment of the present disclosure. The method 300 includes providing 304 a first pattern of the railing assembly on a work surface of a table. In one example, an operator can select a desired pattern using a GUI displayed within a touch screen display of a control panel. The pattern can be selected from a database of railing assembly patterns or imported from another application (e.g., a Computer-Aided Drawing (CAD) software application). Thus, standard or custom railing assembly patterns can be selected depending on a given application or customer preference. With the pattern selected, the operator using the control panel can initiate a series of routines and sub-routines in which the ink dispenser deposits ink onto the work surface 120 in a pattern 172 as shown in FIG. 4A, for example.

Figure 4B:
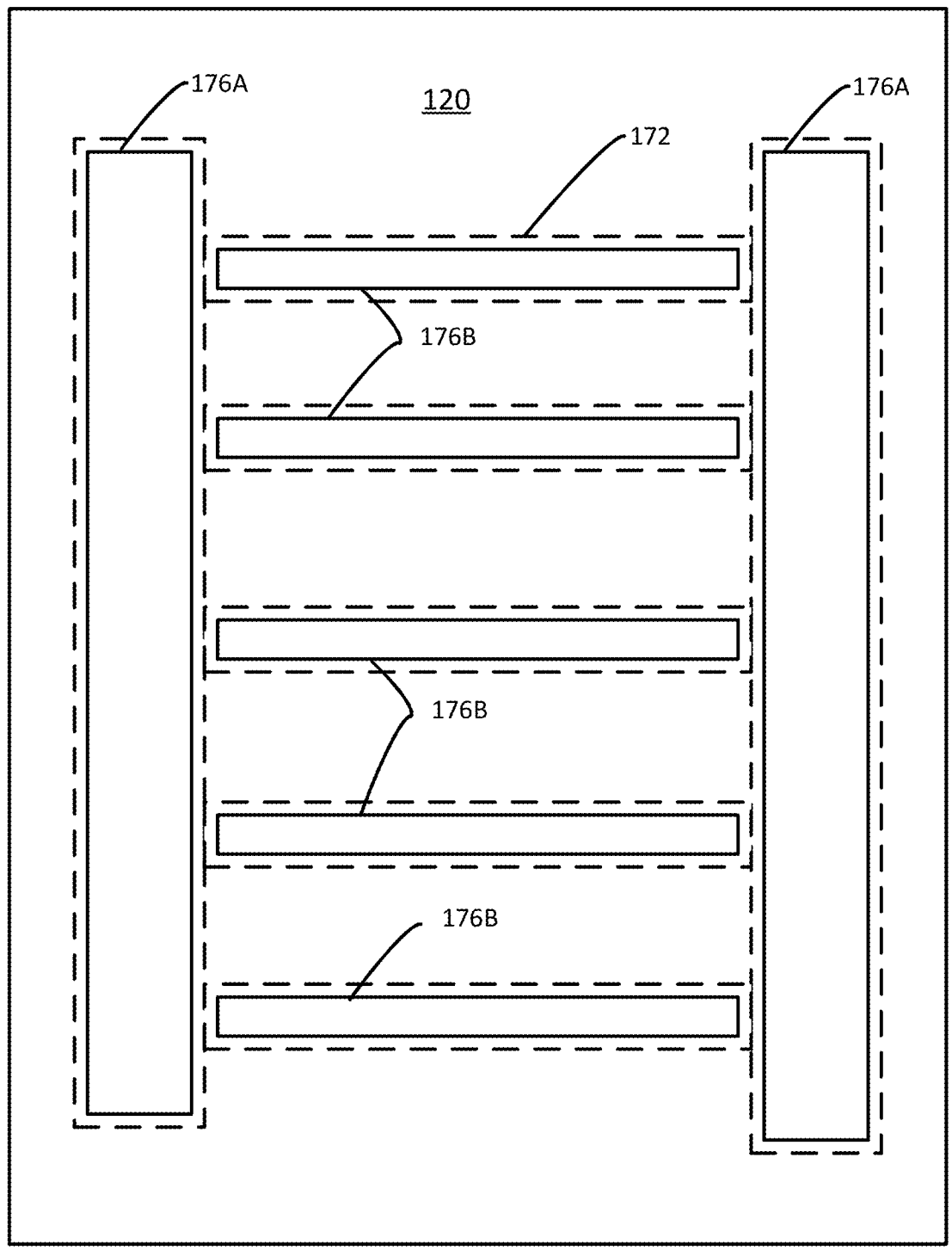
FIG. 4B is a schematic view railing pieces positioned within a pattern on the work surface of the fabrication layout device, in accordance with an embodiment of the present disclosure.

The method 300 further includes positioning 308 a plurality of railing components along the first pattern on the work surface. Once formed on the work surface, the railing assembly pattern is used as a guide in which to locate the various pieces of the assembly relative to one another along the table. As shown in FIG. 4B, in one example, the pattern is in the form of an outline of a railing assembly, in which the railing pieces 176A and 176B are positioned within the outline relative to one another. When laid out in this fashion, measurements between railing pieces are not needed because the position of each piece relative to adjacent pieces is defined by the pattern. Thus, the railing pieces can be quickly and efficiently laid out onto the work surface 120 without the necessity of repeated measurements. In addition, when laid out in such a manner, the accuracy of the final design is significantly improved since the fabricator has a visual reference that provides a visual cue or indication that a piece is misaligned or misplaced before two pieces are attached to one another.

Figure 4C:
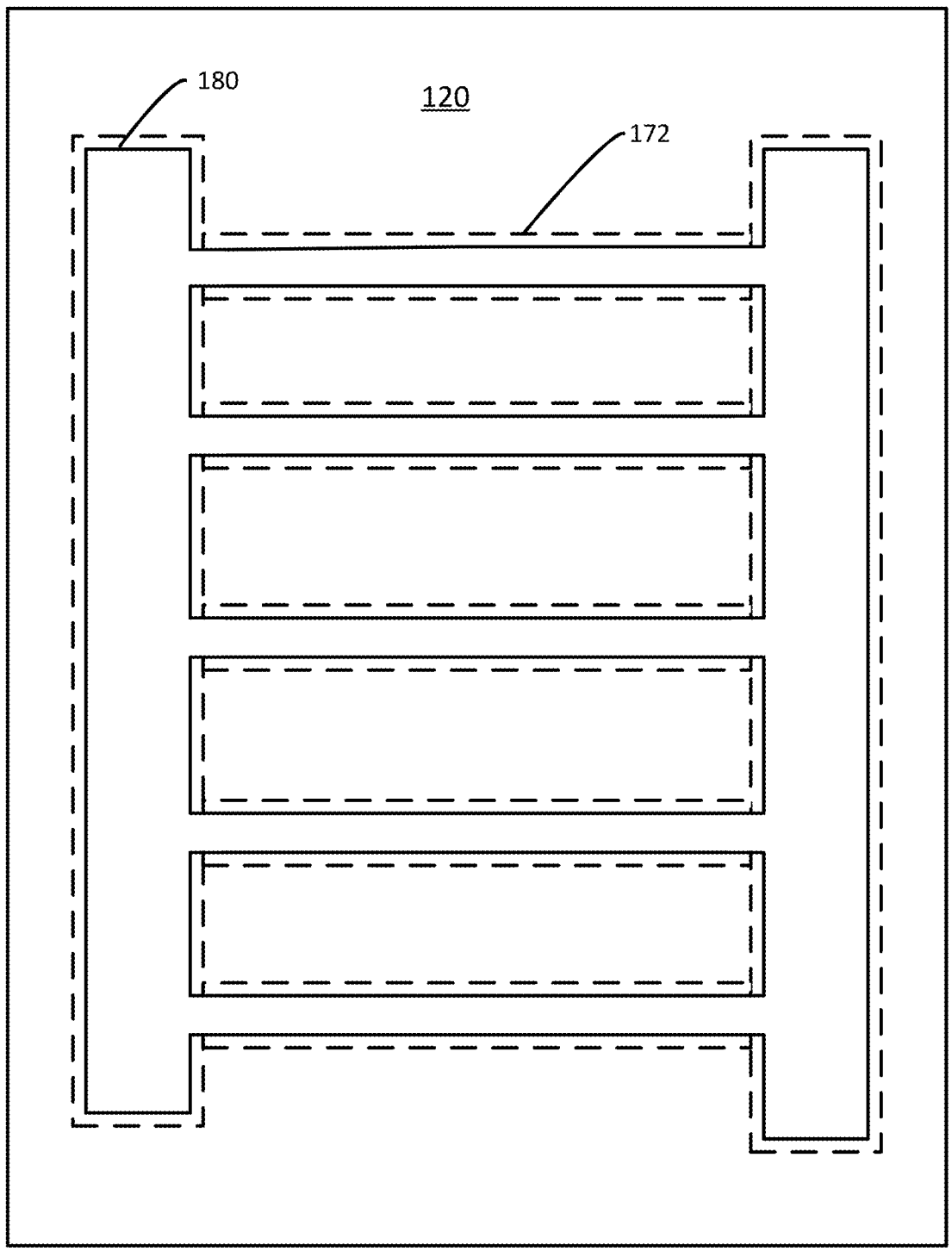
FIG. 4C is a schematic view of a railing assembly produced using the pattern disposed on the work surface of the fabrication layout device, in accordance with an embodiment of the present disclosure.

The method 300 also includes attaching 312 the positioned railing pieces to one another to form the railing assembly. In one example, the railing pieces are manufactured from metal, such as cast iron or carbon steel, and attached to each other using fabrication techniques, such as welding, brazing, and soldering, to form a railing assembly 180, as shown in FIG. 4C. The railing pieces are attached to one another while positioned on the work surface 120 of the table. The railing pieces can be safely attached together, because the table includes a grounding lug that is configured to transfer an unintended discharge electrical energy (e.g., an arc strike) received by the work surface to ground. In addition, the work surface 120 provides sufficient clearance to allow one or more fabricators to concurrently fabricate railing assembly 180. The railing assembly 180 can be partially or completely assembled while the railing pieces are positioned on the work surface. For instance, in some examples, the railing pieces can be initially tack welded together while positioned within the railing assembly pattern 172 deposited on the work surface. The railing assembly 180 can next be removed from the table and brought to another location to complete the fabrication of the railing assembly 180. In other instances, the railing pieces can be completely attached to one another while positioned on the work surface 120. In some instances, the railing pieces are first welded on two or more sides so that multiple sides of the joint between two pieces are made. Next, the assembly is rotated relative to the work surface 120 to expose the remaining portion of the joints of the assembly 180 that were previously not accessible, and thus remain unmade. Once rotated, the newly exposed portions of the joints of the railing pieces can be made.

The method 300 further includes removing 316 the first pattern from the work surface of the table. The first pattern is removed from the work surface so that subsequent patterns can be provided thereon. In some cases, the railing assembly is first removed from the work surface to provide access or to otherwise expose the first pattern on the work surface. In other cases, the railing assembly can remain on the work surface while the first pattern is removed. In such cases, the railing assembly can be positioned to another portion of the work surface that does not include the first pattern. The railing assembly can be positioned on the work surface so that a portion or the entire pattern is exposed. Once exposed, the pattern can be removed by buffing or polishing the work surface with a cleaning detergent or metal polishing compound. The detergent or polishing compound can be applied by hand or using a mechanical device, such as buffing wheel attached to a hand-held drill. Once the pattern is removed from the work surface, another pattern can be deposited onto the work surface without affecting the appearance of the next pattern.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. An assembly table comprising:
a table having a base and a continuous metal work surface on the base, the metal work surface in sheet or plate form and that is sized and configured to support a metal assembly;
a support member extending over the metal work surface and movable along the metal work surface;
a marking tool attached to the support member and movable along the support member, the marking tool configured to move vertically into contact with the metal work surface and to mark the metal work surface;
motors operable to move the support member relative to the metal work surface and to move the marking tool relative to the support member;
a controller having a graphical user interface, at least one processor, and a memory, the controller including executable code that, when executed by the at least one processor, causes the motors to move the marking tool to mark the metal work surface with position indicators for a plurality of members to be assembled to form the metal assembly; and
a cable tray extending along the table and including one or more cables extending between the controller and the motors.

2. The assembly table of claim 1, wherein the position indicators include corner markings representing intersections between at least some of the plurality of members.

3. The assembly table of claim 1, wherein the position indicators comprise a line drawing of the metal assembly.

4. The assembly table of claim 1, wherein the position indicators represent ends of at least some of the plurality of members.

5. The assembly table of claim 1, wherein the graphical user interface is configured to enable a user to select an assembly pattern for the metal assembly, and wherein the position indicators are based on the assembly pattern.

6. The assembly table of claim 5, wherein the controller comprises a memory coupled to the controller, the memory storing a plurality of assembly patterns.

7. The assembly table of claim 1, wherein the plurality of members includes one or more first members extending in a first direction and one or more second members extending in a second direction transverse to the first direction.

8. The assembly table of claim 1, wherein the position indicators define one or more first members extending in a first direction and one or more second members extending in a second direction transverse to the first direction.

9. The assembly table of claim 1, wherein the marking tool comprises an ink dispenser.

10. The assembly table of claim 1, wherein the base includes a plurality of hollow structural sections made of a metal.

11. The assembly table of claim 10, wherein the metal is steel and the hollow structural sections have a rectangular cross-sectional shape.

12. An assembly station comprising:
a table with a base and a metal work surface on the base, the metal work surface having a form of a continuous sheet or plate;
a support member extending over the metal work surface and movable along the table;
a marking device attached to the support member and movable along the support member, the marking device configured to mark the metal work surface;
motors operable to move the support member along the guide rails and to move the marking device along the support member; and
a controller with a graphical user interface, the controller including executable code that, when executed by the controller, causes the motors to move the marking device and to mark the metal work surface with position indicators for a plurality of members to be assembled to form a metal assembly,
wherein the graphical user interface is configured to enable a user to select an assembly pattern for the metal assembly, and wherein the position indicators are based on the assembly pattern.

13. The assembly station of claim 12, wherein the controller comprises a memory coupled to the controller, the memory storing a plurality of assembly patterns.

14. The assembly station of claim 12, wherein the metal work surface is made of stainless steel and has a length of at least 10 feet.

15. The assembly station of claim 14, wherein the metal work surface is secured to the base.

16. The assembly station of claim 12, wherein the plurality of members includes one or more first members extending in a first direction and one or more second members extending in a second direction transverse to the first direction.

17. The assembly station of claim 12, wherein the position indicators include corner markings representing intersections between at least some of the plurality of members.

18. The assembly station of claim 12, wherein the position indicators comprise a line drawing of the metal assembly.

19. The assembly station of claim 12, wherein the position indicators represent ends of at least some of the plurality of members.

20. The assembly station of claim 12, wherein the marking device comprises an ink dispenser or an ink marker.

* * * * *